United States Patent [19]

Nishino et al.

[11] 4,409,125

[45] Oct. 11, 1983

[54] PROCESS FOR PRODUCING ACTIVATED FIBROUS CARBON

[75] Inventors: Hiroshi Nishino, Osaka; Masayuki Suzuki, Kyoto; Hideo Hirota, Sennan, all of Japan

[73] Assignee: Takeda Chemical Industries, Ltd., Osaka, Japan

[21] Appl. No.: 266,012

[22] PCT Filed: Jun. 22, 1979

[86] PCT No.: PCT/JP79/00160

§ 371 Date: Feb. 22, 1980

§ 102(e) Date: Jul. 2, 1979

[30] Foreign Application Priority Data

Jun. 22, 1978 [JP] Japan ................................. 53/76039
Jul. 10, 1978 [JP] Japan ................................. 53/84231

[51] Int. Cl.$^3$ ...................... C01B 31/12; B01J 20/20; D01F 9/12
[52] U.S. Cl. .................................. 502/180; 264/29.2; 423/447.4; 423/447.5; 423/447.9; 502/181
[58] Field of Search .............................. 252/422, 423; 423/447.4, 447.5, 447.9; 264/29.2

[56] References Cited

U.S. PATENT DOCUMENTS 3,847,833 11/1974 Bailey et al. ...................... 252/422
3,969,268 7/1976 Fukuda et al. ...................... 252/423
4,274,979 6/1981 Simpson ............................. 252/422

FOREIGN PATENT DOCUMENTS 983225 2/1976 Canada ............................. 264/29.2
1505095 3/1978 United Kingdom .

OTHER PUBLICATIONS

Chemical Engineering Progress-vol. 58, No. 10-10/62 pp. 42-50: "Carbon-Base Fiber Reinforced Plastics" D. L. Schmidt et al.

Primary Examiner—P. E. Konopka
Attorney, Agent, or Firm—Wenderoth, Lind & Ponack

[57] ABSTRACT

A process for producing activated fibrous carbon comprises carbonizing and activating vegetable fibers in the presence of at least a member selected from the group consisting of ammonium salts of inorganic acids, nitric acid and boric acid and zinc chloride of about 5 to 80 parts by weight per 100 parts by weight of the vegetable fibers. The process increases remarkably a yield of activated fibrous carbon and therefore permits the supply of activated fibrous carbon at by far reduced costs as compared with the conventional process, and the resulting activated carbon shows superior adsorption capability and flexibility.

3 Claims, No Drawings

PROCESS FOR PRODUCING ACTIVATED FIBROUS CARBON

DESCRIPTION

1. Technical Field

The present invention relates to a method for producing activated fibrous carbon with the use of vegetable fibers as a raw material.

2. Background Art

Activated fibrous carbon is easier to handle and is provided with the improved adsorption capacity, as compared with powdered carbon, and has recently been drawing greater attraction as the adsorbent.

Activated fibrous carbon has been conventionally produced using acrylic fibers as the raw material. In such a conventional process, acrylic fibers, while tension is being applied, are firstly subjected to oxidation-treatment under an oxidizing atmosphere at a temperature of about 200° to 300° C. for a period of time as long as 10 to 20 hours to make them adequately flame retardant. The thus treated materials are then burned in an atmosphere of steam at increased temperature up to about 900° to 1000° C. for a period of about 20 minutes to 3 hours, resulting in activated fibrous carbon.

Yet, the process with the use of acrylic fibers as raw material is accompanied with the defects that increased length of time is required in the step of flame-resistance treatment and that the period of time and temperature for the step of activation must be prolonged and elevated.

There is also known a method for producing activated fibrous carbon comprising immersing cellulose based fibers such as cotton and rayons in an aqueous solution of zinc chloride, and effecting carbonization and activation at 500° to 800° C. after drying. However, it has been proven that the activated fibrous carbon is not necessarily satisfactory in the flexibility.

A thorough and extensive research study carried out by the inventors in view of these circumstances has shown that carbonization and activation of vegetable fibers in the presence of at least a member selected from the group consisting of ammonium salts of inorganic acids, boric acid and nitric acid and a particular ratio of zinc chloride lead to a remarkable increase in the yield of the activated fibrous carbon, along with the improved adsorption capacity. It has been found out, in particular, that the activated fibrous carbon with an increased degree of flexibility can be produced by carbonizing vegetable fibers in the presence of at least a member selected from the group consisting of ammonium salts of inorganic acids, boric acid and nitric acid, and activating then the carbonized materials in the presence of zinc chloride of a specific ratio. Further, the yield for the activated fibrous carbon has been proven to be increased remarkably.

On the basis of these findings, the present invention has been completed.

DISCLOSURE OF THE INVENTION

The present invention relates to a process for producing activated fibrous carbon characterized by carbonizing and activating vegetable fibers in the presence of at least a member selected from the group consisting of ammonium salts of inorganic acids, nitric acid and boric acid and zinc chloride of about 5 to 80 parts by weight for 100 parts by weight of the vegetable fibers.

The vegetable fibers which are useful in the present invention include all the fibers obtained from plants as starting materials, and are exemplified by seed fibers (e.g. cotton, kapok, bombax cotton, silk cotton, vegetable silk, etc.), bast fibers (e.g. flax, hemp, jute, ramie, kenaf, sunn kemp, etc.), leaf fibers (e.g. Manila hemp, New Zealand flax, sisal hemp, pita fibers, etc.), fibers from fruits (e.g. coconuts, etc.), and others (e.g. rush, straws, fibers from seaweed algae, nettle, etc.) as well as regenerated artificial fibers based on cellulose such as viscose and cuprammonium rayons and semi-synthetic fibers based on cellulose such as acetate fibers and acetylated staple fibers. These fibers may be in the fibrous form or may be in the form of fiber structures such as woven fabrics, non-woven fabrics and felt paper.

As the ammonium salts of inorganic acids, which are useful in the present invention, are mentioned, for example, ammonium chloride, ammonium nitrate, ammonium sulfate, ammonium phosphate, diammonium hydrogen phosphate, ammonium borate, ammonium phosphite, etc., and, among these ammonium salts, ammonium chloride yields the preferred results.

In the present invention, vegetable fibers are carbonized and activated. In the case where the carbonization and activation step is carried out without being divided in the two stages as described later, at least a member selected from the group consisting of ammonium salts of inorganic acids, nitric acid and boric acid and zinc chloride are ordinarily supported on vegetable fibers. The supported amounts of them for vegetable fibers, when expressed on the basis of 100 parts by weight of the vegetable fibers, are about 0.5 to 25 parts by weight and preferably, about 10 to 20 parts by weight, in the case of ammonium salts of inorganic acids; about 0.1 to 10 parts by weight, and preferably, about 0.5 to 5 parts by weight, in the case of nitric acid; about 0.1 to 10 parts by weight, and preferably, about 0.5 to 5 parts by weight, in the case of boric acid; and, about 5 to 80 parts by weight, and preferably about 10 to 30 parts by weight, in the case of zinc chloride.

As the means of supporting the aforementioned compounds on vegetable fibers are for example mentioned those of immersing vegetable fibers in solutions of the aforementioned compounds, or spraying solutions of the aforementioned compounds over vegetable fibers.

The content in a solution of ammonium salts of inorganic acids, nitric acid or boric acid, though varying with the kind of compounds, etc., are preferably about 1 to 30% by weight in the case of ammonium salts of inorganic acids; about 0.1 to 5% by weight in the case of nitric acid; and, about 0.1 to 5% by weight in the case of boric acid.

The solutions may be aqueous ones or those containing alcohol, etc.

The concentration of the solution of zinc chloride is about 5 to 60% by weight, and preferably, about 10 to 50% by weight. In order to increase the solubility of zinc chloride, to the solution may be added, for example, hydrochloric acid and alcohols, and the ratio may be within 5% by weight based upon the whole solution.

The temperature of carbonization and activation is about 400° to 750° C., and preferably, 450° to 650° C., while the length of time thereof is about 0.25 to 2 hours, and preferably, about 0.5 to 1 hour. Such a process or operation is ordinarily carried out, for example, in a furnace such as electric and gas-fired furnaces. The heating-up rate, at which the temperature inside the furnace is allowed to reach the prescribed temperatures as mentioned above, is about 5° to 75° C./min, and preferably, about 10° to 45° C./min. Alternatively, heating may be effected to attain the prescribed temperature, after placing vegetable fibers inside a furnace which has been warmed in advance up to an inner temperature of 100° to 200° C. Carbonization and activation are ordinarily carried out in an atmosphere of inert gas such as nitrogen gas, and waste combustion gas from heavy oil, light oil, kerosene, etc.

In the present invention, the above described operation may be conducted, while dividing it into two stages of carbonization and activation of vegetable fibers. In this case, vegetable fibers are first carbonized, in the presence of at least a member selected from the group consisting of ammonium salts of inorganic acids, nitric acid and boric acid, is an atmosphere of inert gas as described above, at a temperature of about 250° to 450° C., and preferably, about 0.5 to 1 hour. Then, the carbonized materials obtained in the manner are activated in the presence of zinc chloride. At least one member selected from the group consisting of ammonium salts of inorganic acids, nitric acid and boric acid, and zinc chloride, which are used in the aforementioned operations, are ordinarily supported on vegetable fibers and their carbonized materials, respectively. As the means of supporting zinc chloride on carbonized materials are mentioned, for example, the means of immersing carbonized materials in a solution of zinc chloride, and of spraying a solution of zinc chloride over carbonized materials. The supported amount of zinc chloride is about 30 to 200 parts by weight, and preferably, 50 to 150 parts by weight, as zinc chloride, on the basis of 100 parts by weight of the carbonized material. Activation is carried out by calcining in an atmosphere of nitrogen or waste combustion gas from heavy oil, light oil, kerosene, etc., at a temperature of about 350° to 750° C., for about 0.25 to 2 hours. In this case, heating-up of a furnace is effected in accordance with the operation as described above. When the steps of carbonization and activation for vegetable fibers are conducted separately in two stages, in the manner as described above, the resulting activated fibrous carbon possesses a particularly improved flexibility. The activated fibrous carbon produced in this manner, if necessary, may be further subjected to washing and drying in accordance with a conventional method.

The method according to the present invention increases remarkably the yield of activated fibrous carbon, and can supply activated fibrous carbon at by far reduced costs, as compared with the conventional process and both adsorption capability and flexibility of the resulting activated carbon are superior; this is the very useful, industrial process.

BEST MODE FOR CARRYING OUT THE INVENTION

Example 1

Commercially available cotton cloth (bleached cotton) is immersed for about 5 minutes in an aqueous solution containing 20% by weight of zinc chloride, 15.5% by weight of ammonium chloride and 1% by weight of hydrogen chloride, and squeezed by use of rubber rollers to support uniformly the solution. The supported amounts of the chemicals are, on the basis of 100 g of the raw cloth, 23 g of zinc chloride, 17 g of ammonium chloride, and not more than 1 g of hydrogen chloride. The raw cloth supported with the chemical solution is wound up on a roll of 16-mesh wire net made of stainless steel, and carbonized and activated in a circular type electric furnace, in a stream of nitrogen gas, at a temperature of 600° C., for about ½ hour. In this case, the heating-up rate is 15° C./min. Thus the activated fibrous carbon A is obtained. The yield and adsorption capability are as shown in Table 1.

Reference Example 1

The activated fibrous carbon B is produced in the same manner as described in Example 1, while using an aqueous solution containing 20% by weight of zinc chloride and 0.2% by weight of hydrogen chloride. The yield and adsorption capability are shown in Table 1. The supported amount of zinc chloride is 35 g/100 g of the raw cloth, and that of hydrogen chloride is not more than 1 g/100 g of the raw cloth.

Example 2

Commercially available cotton cloth is immersed for about 5 minutes in an aqueous solution containing 25% by weight of zinc chloride, 2.5% by weight of boric acid and 2% by weight of hydrogen chloride, and then dehydrated by means of a centrifuge to have the chemical solution supported uniformly. The supported amounts of the chemicals, on the basis of 100 g of the raw cloth, are 36 g of zinc chloride, 6 g of boric acid, and about 1 g of hydrogen chloride. The raw cloth supported with the chemical solution is wound up on a 16-mesh wire net made of stainless steel, and carbonized and activated in a circular type electric furnace, in a stream of nitrogen gas, at a temperature of 550° C., for ¾ hour, to produce the activated fibrous carbon C. In this case, the heating-up rate is 30° C./min. The yield and adsorption capability of the activated carbon C are as shown in Table 1.

Example 3

The activated fibrous carbon D is produced in the same manner as described in Example 2, except that an aqueous solution containing 25% by weight of zinc chloride, 12.5% by weight of ammonium chloride, 5% by weight of boric acid and 1% by weight of hydrogen chloride is supported. The yield and adsorption capability of the activated carbon D are as shown in Table 1.

The supported amounts are 27 g of zinc chloride relative to 100 g of the raw cloth, 15 g of ammonium chloride relative to 100 g of the raw cloth, 5 g of boric acid relative to 100 g of the raw cloth, and not more than 1 g of hydrogen chloride relative to 100 g of the raw cloth, respectively.

Example 4

The activated fibrous carbon E is produced in the same manner as described in Example 1, except that an aqueous solution containing 15% by weight of zinc chloride, 2% by weight of nitric acid and 1% by weight of hydrogen chloride is supported. The yield and adsorption capability of the activated carbon E are as shown in Table 1.

The supported amounts are 20 g of zinc chloride relative to 100 g of the raw cloth, 5 g of nitric acid relative to 100 g of the raw cloth and not more than 1 g of hydrogen chloride relative to 100 g of the raw cloth.

TABLE 1

| Activated fibrous carbon | Production yield, % | BET surface area, m²/g | Adsorption capability — Acetone adsorption capability*, g/100 g A.C. |
|---|---|---|---|
| Activated fibrous carbon A | 46.7 | 890 | 19.2 |
| Activated fibrous carbon B | 30 | 680 | 17 |
| Activated fibrous carbon C | 37.9 | 1170 | 25.3 |
| Activated fibrous carbon O | 45.2 | 1100 | 23.8 |
| Activated fibrous carbon E | 38.0 | 805 | 19.1 |

Remarks:
*Calculated on the basis of increases in weight determined when adsorption is effected at 25° C. for 1.5 hours with the use of air containing 37.5 g/m³ of acetone.

Reference Example 2

Commercially available cotton cloth (bleached cotton) is wound up on a 16-mesh net-like tube made of stainless steel, and carbonized in a silica glass tube, in a stream of nitrogen gas, at a temperature of 350° C. for 0.5 hour. The heating-up rate is 15° C./min. Following carbonization, inspection after being cooled down to ambient temperature reveals 21% of the carbonization yield. The carbonized materials are immersed for about 5 minutes in an aqueous solution containing 20% by weight of zinc chloride and 1% by weight of hydrogen chloride, and squeezed to remove the excessive solution by rubber rollers, whereby to support zinc chloride uniformly; the supported amount is 67 g as zinc chloride/100 g of the carbonized material. The carbonized materials are activated in a stream of nitrogen gas, at a temperature of 550° C. for 0.5 hour. In this case, the heating-up rate is 15° C./min. Following the activation, the material is washed, refined and dried to obtain the activated fibrous carbon F with improved flexibility at a yield of 15%. The maximum amount of acetone to be adsorbed at 25° C., when determined on the activated carbon F with the use of air having 37.5 g/m³ of the acetone concentration, is 21% by weight.

Example 5

Commercially available hemp cloth is immersed for 3 minutes in a previously prepared aqueous solution containing 3% by weight of boric acid, and squeezed by means of a centrifuge to be impregnated uniformly with boric acid of 2.5 g/100 g of the raw cloth. The cloth impregnated with the chemical solution is, in the same manner as described in Reference Example 2, carbonized at 350° C. for 0.75 hour. The carbonized material is impregnated with a solution containing 15% by weight of zinc chloride at a rate of 65 g as zinc chloride/100 g of the carbonized material, and activated at 550° C. for 0.5 hour. Then, washing, refining, and drying result in the satisfactorily activated fibrous carbon G at a yield of 36%. The acetone adsorption capability of the activated carbon G is 19.8%.

Example 6

Commercially available hemp cloth is immersed for 3 minutes in a previously prepared aqueous solution containing 15.5% by weight of ammonium chloride, and aqueezed by means of rubber rollers, to be impregnated uniformly with ammonium chloride of 22 g as ammonium chloride/100 g of the raw cloth. The cloth impregnated with the solution is, in the same manner as described in Reference Example 2, carbonized at 350° C. for 1 hour. The carbonized material is impregnated with a solution containing 40% by weight of zinc chloride at a rate of 120 g as zinc chloride/100 g of the carbonized material, and activated at 570° C. for 1 hour. Then, washing, refining and drying result in the satisfactorily activated fibrous carbon H in a yield of 40%. The acetone adsorption capability of the activated carbon is 22%.

Example 7

Commercially available cotton cloth (bleached cotton) is immersed for 5 minutes in a previously prepared aqueous solution containing 20% by weight of ammonium sulfate, and squeezed by means of a centrifuge to be impregnated uniformly with the chemical solution at a rate of 18 g as ammonium sulfate/100 g of the raw cloth. The cloth impregnated with the solution is, in the same manner as described in Reference Example 2, carbonized at 350° C. for 1 hour. The carbonized material is impregnated with a solution containing 40% by weight of zinc chloride at a rate of 118 g as zinc chloride/100 g of the carbonized material, and carbonized at 600° C. for 1 hour. Then, washing, refining and drying result in the satisfactorily activated fibrous carbon I in a yield of 39.8%. The acetone adsorption capability of the activated carbon is 22.5%.

Industrial Applicability

The activated fibrous carbon to be prepared by the method according to the present invention is useful for effective removal of organic substances, foul-smelling components, e.g., 1. Purification of air in buildings, restaurants, coffee-houses, hospitals, vehicles (e.g. automobiles, railway vehicles, airplanes), and the like,
2. Prevention of bad or offensive smells in refuse-treatment plants, animal-breeding chambers, etc.,
3. Removal of organic solvents to be exhausted from factories engaged in dry-cleaning, rubber processing or manufacture, metal-surface working, fiber reinforced-plastics fabrication, manufacture of synthetic fibers, cellophanes or films, paint application, etc.,
4. Medical appliances or supplies such as artificial kidney, artificial liver and hygienic goods (e.g. masks),
5. Filter tips for cigarettes.

In the application fields mentioned under the items 1 through 3, there may be utilized activated fibrous carbon produced using as raw materials vegetable fibers of a fibrous structure material such as woven fabrics, nonwoven fabrics and felt paper in the form of filter cloth. In the case of the aforementioned item 4, the material to be produced from vegetable fibers of a fibrous structure material is wrapped by a gauze and the like to be utilized. In the case mentioned above under the item 5, activated fibrous carbon is crushed, and dispersed in acetate fibers so as to be utilized in the filter form (fiber bundles).

We claim:

1. A process for producing activated fibrous carbon, which comprises carbonizing vegetable fibers in the presence of at least one member selected from the group consisting of ammonium salts of inorganic acids, nitric acid and boric acid and then activating the carbonized material, in the presence of 30 to 200 parts by weight of zinc chloride on the basis of 100 parts by weight of the carbonized material, in an atmosphere of nitrogen gas or a combustion gas from heavy oil, light oil or kerosene, at 350° C. to 750° C. for 0.25 to 2 hours.

2. A process as claimed in claim 1, wherein the carbonization temperature is at about 250° to 450° C.

3. A process as claimed in claim 1 wherein the ammonium salt of inorganic acid is ammonium chloride.

* * * * *